Patented Mar. 10, 1953

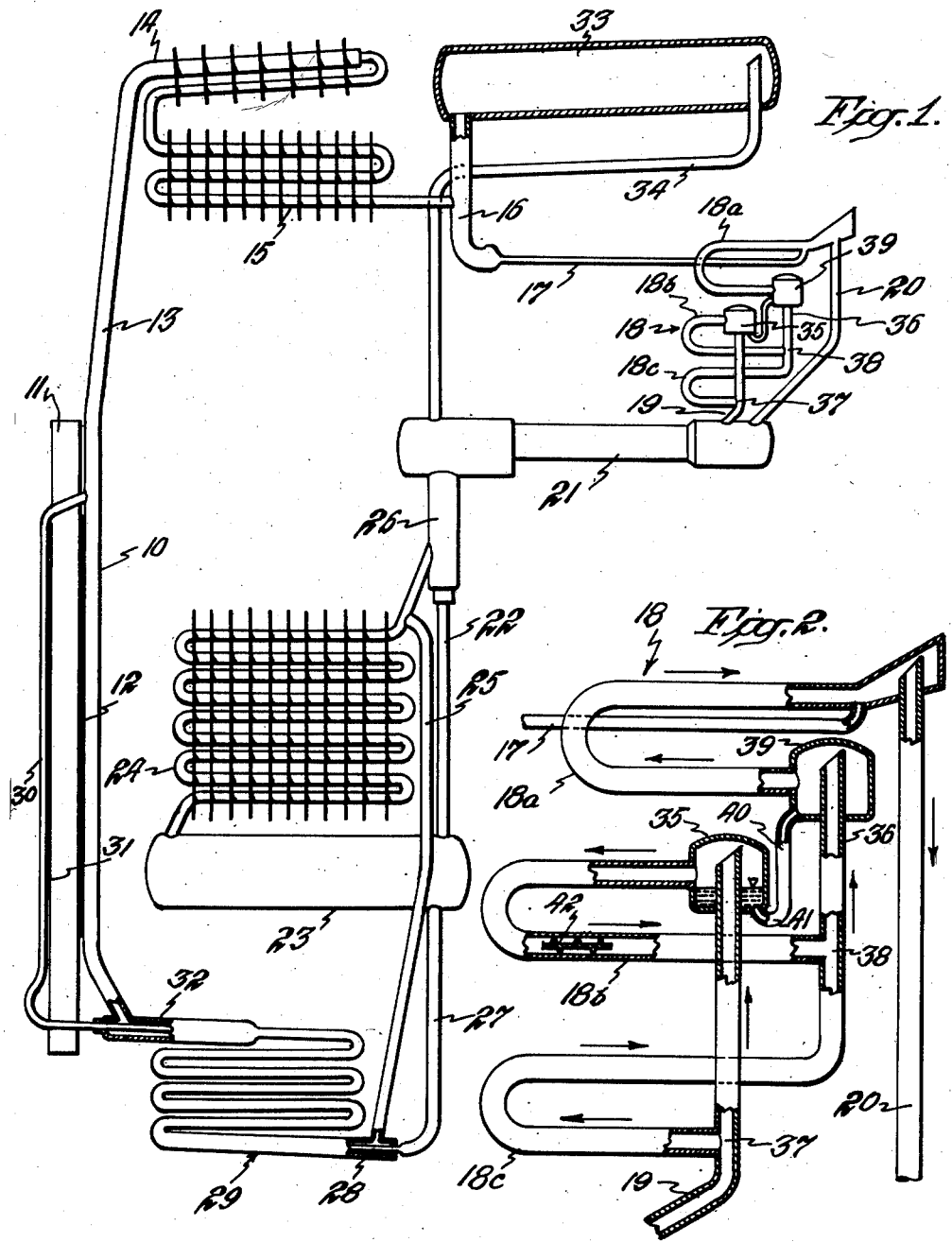

2,630,689

UNITED STATES PATENT OFFICE 2,630,689

ABSORPTION REFRIGERATION

Axel Gosta Hellstrom, Evansville, Ind., assignor to Aktiebolaget Elektrolux, Stockholm, Sweden, a corporation of Sweden Application December 14, 1948, Serial No. 65,158
In Sweden December 15, 1947

11 Claims. (Cl. 62—119.5)

My invention relates to refrigeration, and more particularly to a refrigeration system employing evaporation of refrigerant fluid in the presence of an inert gas.

It is an object of the invention to improve the operation of systems of this type, particularly to obtain better use of cooling effect.

The above and other objects and advantages of the invention will be more fully understood upon reference to the following description and the accompanying drawing forming a part of this specification, and of which Fig. 1 illustrates more or less diagrammatically a refrigeration system embodying the invention; and Fig. 2 is an enlarged fragmentary view, partly broken away and in section, of a part of the system shown in Fig. 1 to illustrate the invention more clearly.

Referring to Fig. 1, I have shown my invention in connection with an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat is supplied to the boiler 10 from a heating tube or flue 11 thermally connected therewith at 12, as by welding, for example. Although not shown, the heating tube 11 may be heated in any suitable manner, as by an electrical heating element disposed within the lower part of the heating tube or by a liquid or gaseous fuel burner which is adapted to project its flame into the lower end of the tube.

The heat supplied to the boiler 10 and its contents expels refrigerant vapor out of solution, and such vapor passes upwardly through a conduit 13 and air cooled rectifier 14 into an air cooled condenser 15 in which it is condensed and liquefied. Liquid refrigerant flows from condenser 15 through conduits 16 and 17 into an evaporator or cooling unit 18. In the cooling unit 18 liquid refrigerant evaporates and diffuses into an inert pressure equalizing gas, such as hydrogen, which enters through a conduit 19. Due to evaporation of refrigerant into inert gas, a refrigerating effect is produced with consequent absorption of heat from the surroundings.

The rich gas mixture of refrigerant vapor and inert gas formed in cooling unit 18 flows from the upper part thereof through a conduit 20, one passage of a gas heat exchanger 21, conduit 22 and absorber vessel 23 into the lower end of an absorber coil 24. In absorber coil 24 the rich gas mixture flows counter-current to downwardly flowing absorption liquid which enters through a conduit 25. The absorption liquid absorbs refrigerant vapor from inert gas, and inert gas weak in refrigerant flows from absorber coil 24 in a path of flow including a conduit 26 which is disposed about the upper part of conduit 22, another passage of gas heat exchanger 21 and conduit 19 into the lower part of the cooling unit 18.

The circulation of gas in the gas circuit just described is due to the difference in specific weight of the columns of gas rich and weak, respectively, in refrigerant vapor. Since the column of gas rich in refrigerant vapor and flowing from cooling unit 18 to the absorber coil 24 is heavier than the column of gas weak in refrigerant vapor and flowing from the absorber coil 24 to cooling unit 18, a force is produced or developed in a major portion of the gas circuit for causing circulation of inert gas in all parts of the cooling unit 18 in the manner described.

Absorption solution enriched in refrigerant flows from the absorber vessel 23 through a conduit 27 and an inner passage or pipe 28 of a liquid heat exchanger 29 into the lower end of a vapor lift pipe or tube 30. Liquid is raised by vapor-liquid lift action through pipe 30, which is in thermal exchange relation with the heating tube 11 at 31, into the upper part of boiler 10. Refrigerant vapor expelled out of solution in boiler 10, together with refrigerant vapor entering through pipe 30, flows upwardly through conduit 13 to the condenser 15, as previously explained. The absorption liquid from which refrigerant vapor has been expelled flows from the boiler 10 through the outer pipe or passage 32 of liquid heat exchanger 29 and conduit 25 into the upper part of absorber coil 24. The circulation of absorption solution in the liquid circuit just described is effected by raising of liquid through pipe 30.

The outlet end of condenser 15 is connected by an upper extension of pipe 16, vessel 33 and conduit 34 to a part of the gas circuit, as at one end of gas heat exchanger 21, for example, so that any inert gas which may pass through the condenser can flow into the gas circuit. Refrigerant vapor not liquefied in the condenser 15 flows through the upper part of conduit 16 to displace inert gas in vessel 33 and force such gas into the gas circuit. The effect of forcing gas into the gas circuit in this manner is to raise the total pressure in the entire system whereby an adequate condensing pressure is obtained to insure condensation of refrigerant vapor in condenser 15.

The cooling unit or evaporator 18 may be formed of piping and includes an upper section 18a, an intermediate section 18b and a lower section 18c. Although the several evaporator sections are diagrammatically shown as looped coils disposed in a vertical plane, it is to be understood that the evaporator sections may be formed in any suitable manner. Thus, each evaporator section may consist of piping including straight portions and connecting bends and disposed essentially in a single horizontal plane, for example, to provide horizontally disposed cooling sections which may be separate from or associated with partitions or shelves provided in a refrigerator cabinet.

In accordance with my invention, in order to effect lower evaporator temperatures and obtain better use of cooling effect, the inert gas flowing toward the evaporator 18 from absorber coil 24 is divided into two paths of flow so that inert gas weak in refrigerant is introduced not only into the lower evaporator section 18c but also into the intermediate evaporator section 18b. As best shown in Fig. 2, part of the weak gas flowing from the absorber coil through conduit 19 passes into the lower end of the lower evaporator section 18c which is connected thereto, and another part of the weak gas passes upwardly through conduit 19 into the upper part of a vessel 35 to which is connected the upper end of the intermediate evaporator section 18b.

Inert gas passes from the upper end of the lower evaporator section 18c into a vertically extending conduit 36 to which is also connected the lower end of the intermediate evaporator section 18b. Hence, the inert gas divided into two streams or paths of flow at the point 37 in conduit 19 again combines and mixes at the point 38 in conduit 36 and passes upwardly therethrough into the upper part of a vessel 39 to which is connected the lower end of the upper evaporator section 18a. Inert gas rich in refrigerant vapor passes from the upper end of evaporator section 18a into the upper end of conduit 20 and passes therethrough toward the absorber coil 24, as previously explained.

As seen in Fig. 2, liquid refrigerant flows successively through the evaporator sections 18a, 18b and 18c, respectively. Liquid refrigerant from the condenser 15 flows through conduit 17 into the upper evaporator section 18a. Unevaporated refrigerant passes from such upper evaporator section 18a into the vessel 39 and thence through a conduit 40 into the vessel 35 for flow through the intermediate evaporator section 18b. The conduit 40 is U-shaped at 41 to provide a liquid seal to prevent gas in vessel 35 from entering the lower end of the upper evaporator section 18a. Unevaporated refrigerant passes from the intermediate evaporator section into the lower part of the conduit 36 and thence into the upper end of the lower evaporator section 18c for flow therethrough. Any unevaporated refrigerant passing from the lower evaporator section 18c flows downwardly through conduit 19 and finds its way to the absorber vessel 23.

Since the inert gas flowing from the absorber coil 24 toward the evaporator is divided into subdivided streams or paths of flow at point 37, it will be evident that inert gas weak in refrigerant and having substantially the same partial vapor pressure of refrigerant is introduced into the intermediate and lower evaporator sections 18b and 18c. Hence, both evaporators 18b and 18c are initially supplied with inert gas weak in refrigerant and having substantially the same partial vapor pressure of refrigerant as the weak gas flowing from the absorber coil 24. Accordingly, both evaporator sections 18b and 18c can be effectively employed as freezing sections.

As seen in Fig. 2, inert gas flows upwardly in the lower evaporator section 18c in counterflow to downwardly flowing liquid refrigerant, while inert gas flows downwardly in the intermediate evaporator section 18b in parallel flow with downwardly flowing liquid refrigerant. It will be understood, however, that the intermediate evaporator section 18b may be connected in the gas circuit so that inert gas will also pass upwardly therethrough in counterflow to liquid refrigerant in the same manner as in the lower evaporator section 18c.

The inert gas passing from the intermediate and lower evaporator sections 18b and 18c and coming together at the point 38 in conduit 36 is partially enriched in refrigerant vapor. Such inert gas flows upwardly in upper evaporator section 18a in counterflow to downwardly flowing liquid refrigerant, and, since the inert gas supplied from conduit 36 is partially enriched in refrigerant vapor, evaporation of refrigerant takes place at a higher temperature in upper evaporator section 18a than in the intermediate and lower evaporator sections 18b and 18c. Hence, the upper evaporator section 18a can be most effectively employed for cooling a storage space of a refrigerator cabinet.

In the embodiment of the invention illustrated, it will be apparent that a greater part of the inert gas will pass upwardly through conduit 19 into the upper end of the intermediate evaporator section 18b and a lesser part will be diverted from conduit 19 into the lower end of the lower evaporator section 18c. Such division of the inert gas will inherently take place due to the fact that the column of inert gas in the conduit 19 of comparatively great vertical height is relatively light in weight, while the column of inert gas of equal height in the lower evaporator section 18c and conduit 36 is heavier by reason of evaporation of refrigerant fluid into such inert gas.

However, the resistance to gas flow in the evaporator sections 18b and 18c may be adjusted in such a manner that the desired distribution of inert gas between these evaporator sections can be obtained. This may be accomplished by providing a suitable throttling member 42 in the evaporator section 18b, for example, such member comprising a metallic element having portions stamped therefrom which are at right angles to the direction of gas flow. In this manner it is possible to subdivide the weak gas in such a manner that the rate of flow of gas through the evaporator sections 18b and 18c will be substantially the same or vary in a definite ratio to meet a particular operating condition.

The resistance offered to flow of gas can be adjusted in other ways. For example, the piping forming the evaporator sections 18b and 18c may be of different lengths and diameters, and throttling members may be provided in one or both of the conduits 19 and 36.

The temperature at which liquid refrigerant evaporates and diffuses into weak gas in the intermediate and lower evaporator sections 18b and 18c is dependent upon the partial pressure of refrigerant vapor in the weak gas. Hence, by providing parallel paths of flow for weak gas in the evaporator sections 18b and 18c, the evaporator section 18b will operate at a lower temperature than in an arrangement where weak gas flows successively through the lower and intermediate evaporator sections 18c and 18b, respectively. In addition, the temperature at which the evaporator section 18b will operate is independent of the evaporation of liquid refrigerant taking place in the lower evaporator section 18c. However, the temperatures at which the evaporator sections 18b and 18c operate will be dependent upon the quantity of inert gas passing through the respective evaporator sections.

By providing an arrangement like that shown and described in which the intermediate evaporator section 18b will operate at a lower temperature, it is possible to freeze ice in a shorter length of time than in an evaporator in which inert gas flows serially through a lower and an intermediate evaporator section. Further, better use of cooling effect is obtained and a lower average temperature will be produced in the freezing portion of the cooling unit.

In refrigeration systems of the kind shown and described, the heat input to the boiler 10 from a heat source through the intermediary of the heating tube 11 is usually controlled thermostatically responsive to a temperature condition affected by the cooling unit 18. Under certain operating conditions substantially no liquid refrigerant or only a relatively small quantity of liquid refrigerant reaches the lower evaporator section 18c. This occurs, for example, when the thermostat control acts to reduce the heat input to the heating tube 11 by the heat source. When no liquid refrigerant reaches the lower evaporator section 18c, this evaporator section in effect acts as a "short-circuit" for the part of the weak gas passing therethrough inasmuch as it is not being utilized to produce useful cooling effect. Such weak gas passing from the lower evaporator section 18c mixes with partially enriched gas at the point 38, and the specific weight of the gas mixture is reduced and becomes less than that of the partially enriched gas flowing from the evaporator section 18b. This results in a reduction in the rate of gas circulation in the gas circuit and liquid refrigerant will evaporate less rapidly and at higher temperatures in the cooling unit 18, so that flow of liquid refrigerant into the lower evaporator section 18c is promoted to enable the latter to function to produce useful refrigeration for making ice and the like.

While a single embodiment of the invention has been shown and described, it will be apparent that modifications and changes may be made without departing from the spirit and scope of the invention. Thus, the several flow paths in the evaporator or cooling unit may be balanced or otherwise adjusted in many different ways, and the weak gas flowing toward the evaporator may be subdivided into two or more paths of flow at different regions in the inert gas circuit. I therefore aim to cover all variations and modifications which come within the true spirit and scope of my invention, as pointed out in the following claims.

What is claimed is:

1. In the art of refrigeration with a system having a main circuit for circulation of inert gas including first and second places of evaporation, the improvement which comprises conducting liquid refrigerant downwardly through said first place of evaporation and then through said second place of evaporation, flowing inert gas weak in refrigerant from a place of absorption and dividing such weak gas into a plurality of streams, initially conducting one of said streams of weak gas to said first place of evaporation, initially conducting another of said streams of weak gas to said second place of evaporation, flowing the separate streams of inert gas to said places of evaporation in paths of flow which are out of heat exchange relation with one another and introducing the streams to said places of evaporation at substantially the same temperature, mixing inert gas passing from said first and second places of evaporation and flowing such mixture to a third place of evaporation, and circulating the gas through each of said places of evaporation by force generated in a major portion of the main gas circuit.

2. In the art of refrigeration with a system having a main circuit for circulation of inert gas including first and second places of evaporation, the improvement which comprises conducting liquid refrigerant downwardly through said first place of evaporation and then through said second place of evaporation, flowing inert gas weak in refrigerant from a place of absorption and dividing such weak gas into a plurality of streams, initially conducting one of said streams of weak gas to said first place of evaporation, initially conducting another of said streams of weak gas to said second place of evaporation, flowing the separate streams of inert gas to said places of evaporation in paths of flow which are out of heat exchange relation with one another and introducing the streams to said places of evaporation at substantially the same temperature, conducting said liquid refrigerant downwardly through a third place of evaporation before flowing through said first and second places of evaporation, mixing inert gas from said first and second places of evaporation in a common path of flow and flowing such mixture to said third place of evaporation, and circulating the gas through each of said places of evaporation by force generated in a major portion of the main gas circuit.

3. In a refrigeration system, a gas circuit comprising evaporator structure including first, second and third sections, said second section being at a lower level than said first section and said third section being at a higher level than said first section, means for conducting liquid refrigerant to said third section and then successively through said first and second sections for gravity flow therethrough, and said gas circuit including connections for subdividing inert gas into a plurality of streams and initially supplying to each of said first and second sections, at substantially the same partial pressure of refrigerant, inert gas from only one of said streams, said connections being so formed and arranged that inert gas is introduced into each of said first and second sections at substantially the same temperature and the inert gas supplied to said lower section flows in counterflow to liquid refrigerant therein, and said third section being connected to receive inert gas from both said first and second sections for flow therethrough in counterflow to liquid refrigerant.

4. In the art of refrigeration with a system having a circuit for circulation of inert gas including first and second places of evaporation, the improvement which comprises conducting liquid refrigerant downwardly through said first place of evaporation and then through said second place of evaporation, flowing inert gas weak in refrigerant from a place of absorption and dividing such weak gas into a plurality of streams, flowing only one of said streams of weak gas in intimate contact with liquid refrigerant in said first place of evaporation and flowing only another of said streams of weak gas in intimate contact with liquid refrigerant in said second place of evaporation, flowing inert gas from both of said first and second places of evaporation in heat exchange relation with weak gas before the latter is divided into a plurality of streams and then flowing such inert gas from said first and second places of evaporation to said place of absorption.

5. The improvement set forth in claim 4 which includes conducting said liquid refrigerant downwardly through a third place of evaporation prior to flowing through said first and second places of evaporation, and flowing enriched inert gas from at least one of said first and second places of evaporation through such third place of evaporation before flowing in heat exchange relation with weak gas.

6. In the art of refrigeration with a system employing inert gas into which liquid refrigerant evaporates, the improvement which comprises conducting liquid refrigerant downwardly through a first place of evaporation and then downwardly through a second place of evaporation at a lower level, circulating inert gas in a gas circuit including said places of evaporation and a place of absorption, flowing part of the inert gas from said place of absorption through said first place of evaporation, flowing inert gas from said first place of evaporation to said place of absorption in a path of flow which by-passes said second place of evaporation, flowing part of the inert gas from said place of absorption through said second place of evaporation, flowing inert gas from said second place of evaporation to said place of absorption in a path of flow which by-passes said first place of evaporation, and, before inert gas flowing from said first and second places of evaporation passes to said place of absorption, flowing such inert gas in heat exchange relation with all of the inert gas flowing from said place of absorption.

7. The improvement set forth in claim 6 which includes conducting said liquid refrigerant downwardly through a third place of evaporation prior to flowing through said first and second places of evaporation, and flowing inert gas from both said first and second places of evaporation through such third place of evaporation before flowing in heat exchange relation with inert gas flowing from said place of evaporation.

8. In a refrigeration system, a gas circuit comprising a gas heat exchanger having a plurality of passages and evaporator structure including a first section and a second section at a lower level, means for conducting liquid refrigerant to said first and second sections for flow therethrough, means for supplying inert gas weak in refrigerant to one of said gas heat exchanger passages, connections interposed between said one gas heat exchanger passage and said evaporator structure for dividing weak gas into a plurality of streams and initially supplying to each evaporator section, at substantially the same partial pressure of refrigerant, inert gas from only one of said streams, conduit means connected to said first and second evaporator sections to receive inert gas enriched in refrigerant from both said sections and also connected to another passage of said gas heat exchanger for flowing such enriched gas in heat exchange relation with weak gas in said one passage before the weak gas is divided into separate streams in said connections interposed between said one gas heat exchanger passage and said evaporator structure.

9. Apparatus as set forth in claim 8 including a third evaporator section connected to at least one of said first and second sections to receive inert gas therefrom, said means for conducting liquid refrigerant being formed and arranged to supply liquid refrigerant to said third section and then to said first and second sections, and said conduit means connected to said other passage of said gas heat exchanger also being connected to said third evaporator section to receive inert gas enriched in refrigerant from such section.

10. Apparatus as set forth in claim 8 in which said first and second evaporator sections are connected for parallel flow of inert gas therethrough.

11. Apparatus as set forth in claim 8 in which said gas circuit includes stationary flow impeding means for regulating the division of weak inert gas into a plurality of separate streams.

AXEL GOSTA HELLSTROM.

REFERENCES CITED

The following references are of record in the file of this patent:

UNITED STATES PATENTS

| Number | Name | Date |
| --- | --- | --- |
| 2,167,663 | Lyford | Aug. 1, 1939 |
| 2,167,697 | Thomas | Aug. 1, 1939 |
| 2,179,734 | Ullstrand | Nov. 14, 1939 |
| 2,269,701 | Ullstrand | Jan. 13, 1942 |
| 2,306,199 | Ullstrand | Dec. 22, 1942 |
| 2,357,612 | Soroka | Sept. 5, 1944 |
| 2,377,051 | Sutton | May 29, 1945 |
| 2,468,104 | Phillips | Apr. 26, 1949 |